United States Patent
Choi

(10) Patent No.: US 10,023,148 B2
(45) Date of Patent: Jul. 17, 2018

(54) CURTAIN AIRBAG FOR VEHICLE

(71) Applicants: Kia Motors Corporation, Seoul (KR); Hyundai Motor Company, Seoul (KR)

(72) Inventor: Jae Ho Choi, Seoul (KR)

(73) Assignees: KIA MOTORS CORPORATION, Seoul (KR); HYUNDAI MOTOR COMPANY, Seoul (KR)

( * ) Notice: Subject to any disclaimer, the term of this patent is extended or adjusted under 35 U.S.C. 154(b) by 94 days.

(21) Appl. No.: 15/223,211

(22) Filed: Jul. 29, 2016

(65) Prior Publication Data

US 2017/0253211 A1 Sep. 7, 2017

(30) Foreign Application Priority Data

Mar. 4, 2016 (KR) .................. 10-2016-0026650

(51) Int. Cl.
*B60R 21/232* (2011.01)
*B60R 21/2338* (2011.01)
(Continued)

(52) U.S. Cl.
CPC ............ *B60R 21/232* (2013.01); *B60R 21/16* (2013.01); *B60R 21/213* (2013.01); *B60R 21/23* (2013.01); *B60R 21/237* (2013.01); *B60R 21/2334* (2013.01); *B60R 21/2338* (2013.01); *B60R 21/23138* (2013.01); *B60R 21/203* (2013.01); *B60R 2021/0009* (2013.01); *B60R 2021/161* (2013.01); *B60R 2021/23386* (2013.01)

(58) Field of Classification Search
CPC ....... B60R 21/232; B60R 21/16; B60R 21/23; B60R 21/2338; B60R 2021/23386
USPC ...................................... 280/743.2
See application file for complete search history.

(56) References Cited

U.S. PATENT DOCUMENTS 7,967,334 B2 * 6/2011 Breuninger ........... B60R 21/231
 280/743.1
8,480,125 B1 * 7/2013 Belwafa .................. B60R 21/21
 280/730.2
(Continued)

FOREIGN PATENT DOCUMENTS

JP 2011-201346 A 10/2011
JP 2015-085928 A 5/2015
(Continued)

*Primary Examiner* — Faye M Fleming
(74) *Attorney, Agent, or Firm* — Morgan, Lewis & Bockius LLP

(57) ABSTRACT

A curtain airbag for a vehicle may include a curtain airbag cushion, a first folding portion formed from an indoor side to a window side of the curtain airbag cushion, at a predetermined distance rearward from a front end of the curtain airbag cushion, a second folding portion formed from the indoor side to the window side of the cushion airbag at a predetermined distance rearward from the first folding portion, a panel tether connecting the first folding portion and the second folding portion to each other on the window side of the curtain airbag cushion, the panel tether being shorter than a length of the window side of the curtain airbag cushion between the first folding portion and the second folding portion, and a protruding portion protruding inward between the first folding portion and the second folding portion of the curtain airbag cushion by tension of the panel tether.

12 Claims, 7 Drawing Sheets

(51) Int. Cl.
  *B60R 21/16* (2006.01)
  *B60R 21/213* (2011.01)
  *B60R 21/23* (2006.01)
  *B60R 21/231* (2011.01)
  *B60R 21/2334* (2011.01)
  *B60R 21/237* (2006.01)
  *B60R 21/203* (2006.01)
  *B60R 21/00* (2006.01)

(56) References Cited

U.S. PATENT DOCUMENTS

| | | | | |
|---|---|---|---|---|
| 9,487,180 | B2* | 11/2016 | Nakashima | B60R 21/233 |
| 9,701,272 | B2* | 7/2017 | Massa | B60R 21/232 |
| 2005/0206138 | A1* | 9/2005 | Breuninger | B60R 21/231 |
| | | | | 280/729 |
| 2008/0079246 | A1* | 4/2008 | Dix | B60R 21/232 |
| | | | | 280/730.2 |
| 2010/0276916 | A1* | 11/2010 | Breuninger | B60R 21/231 |
| | | | | 280/730.2 |
| 2012/0193897 | A1* | 8/2012 | Ruedisueli | B60R 21/21 |
| | | | | 280/730.2 |
| 2014/0333053 | A1* | 11/2014 | Thomas | B60R 21/2338 |
| | | | | 280/743.2 |
| 2016/0031404 | A1* | 2/2016 | Takedomi | B60R 21/2334 |
| | | | | 280/729 |
| 2016/0059816 | A1* | 3/2016 | Je | B60R 21/232 |
| | | | | 280/730.2 |
| 2016/0297394 | A1* | 10/2016 | Fujiwara | B60R 21/232 |
| 2017/0166158 | A1* | 6/2017 | Oh | B60R 21/23138 |

FOREIGN PATENT DOCUMENTS

| | | |
|---|---|---|
| JP | 2016-028932 A | 3/2016 |
| KR | 10-2004-0079246 A | 9/2004 |
| KR | 10-2005-0076045 A | 7/2005 |
| KR | 10-2010-0032205 A | 3/2010 |
| KR | 10-2013-0026812 A | 3/2013 |

* cited by examiner

CURTAIN AIRBAG FOR VEHICLE

CROSS REFERENCE TO RELATED APPLICATION

The present application claims priority to Korean Patent Application No. 10-2016-0026650, filed Mar. 4, 2016, the entire contents of which is incorporated herein for all purposes by this reference.

BACKGROUND OF THE INVENTION

Field of the Invention

The present invention relates to a curtain airbag for a vehicle and, more particularly, to a curtain airbag that prevents a driver from hitting against an A-pillar in a vehicle in an oblique crash.

Description of Related Art

As interest in the safety of passengers in vehicles has increased along with the functionality and convenience of vehicles, the importance of safety-related devices, which can protect passengers in the event of an accident, has increased. Among such safety devices for passengers, an airbag system in particular is basic equipment that distributes shocks applied to a passenger in the event of a collision.

There have been various airbags, including not only airbags that are installed in front of a driver's seat and a passenger seat, but a side airbag and a curtain airbag, which are intended to expand alongside a window in response to impact of force due to a side collision. In particular, the airbag system for a side collision is generally divided into a system using a curtain airbag for protecting the head of a passenger and a system using a side airbag for protecting the side and the chest of a passenger.

In general, a curtain airbag cushion is elongated along a side of the roof panel of a vehicle in the front-rear direction of the vehicle, so when gas is injected from an inflator, the curtain airbag cushion inflates between the door glasses and passengers, thereby protecting the heads of the passengers in the front and rear seats.

However, the two-dimensional plane curtain airbag of the related art cannot sufficiently protect a driver in an oblique crash, so the driver hits hard against an A-pillar inside the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a curtain airbag that can prevent the head of a driver from hitting hard against an A-pillar through the space between a curtain airbag and a driver airbag in an oblique collision.

According to various aspects of the present invention, a curtain airbag for a vehicle may include a curtain airbag cushion, a first folding portion formed from an indoor side to a window side of the curtain airbag cushion, and at a predetermined distance rearward from a front end of the curtain airbag cushion, a second folding portion formed from the indoor side to the window side of the cushion airbag at a predetermined distance rearward from the first folding portion, a panel tether connecting the first folding portion and the second folding portion on the window side of the curtain airbag cushion, the panel tether being shorter than a length of the window side of the curtain airbag cushion between the first folding portion and the second folding portion, and a protruding portion protruding inward between the first folding portion and the second folding portion of the curtain airbag cushion by tension of the panel tether.

The first folding portion and the second folding portion may be inclinedly oriented with upper ends inclined rearward.

The second folding portion may be inclinedly oriented further rearward than the first folding portion.

The first folding portion may be inclinedly oriented with an upper end inclined forward and the second folding portion may be inclinedly oriented with an upper end inclined rearward.

The panel tether may include a first panel tether and a second panel tether, the first panel tether may connect upper ends of the first folding portion and the second folding portion on the window side of the curtain airbag cushion, and the second panel tether may connect lower ends of the first folding portion and the second folding portion on the window side of the curtain airbag cushion.

The second panel tether may be shorter than the first panel tether.

The panel tether may include a first panel tether and a second panel tether, and the first panel tether and the second panel tether may connect upper ends and lower ends of the first folding portion and the second folding portion, crossing each other.

When the curtain airbag is fully inflated, the protruding portion may be positioned behind a front airbag and supported by the front airbag.

When the curtain airbag is fully inflated, the protruding portion may block a space between the curtain airbag and the front airbag, with an indoor end of the protruding portion in contact with a door-side end of the front airbag.

A third folding portion of the curtain airbag may be provided between the first folding portion and the second folding portion, and the protruding portion may be bent to protrude inside at the third folding portion when the curtain airbag is inflated.

A plurality of longitudinal seams may be formed on the protruding portion such that the upper ends at the second folding portion are inclined further rearward than the first folding portion to make an arc shape.

A plurality of longitudinal seams may be formed on the protruding portion, and the number of the seams between the first folding portion and the second folding portion and the number of the seams between the second folding portion and the third folding portion may be different.

According to the curtain airbag for a vehicle of various embodiments of the present invention, it is possible to reduce injury to a driver by preventing the head of the driver from directly hitting against the frame of a vehicle in an oblique collision.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
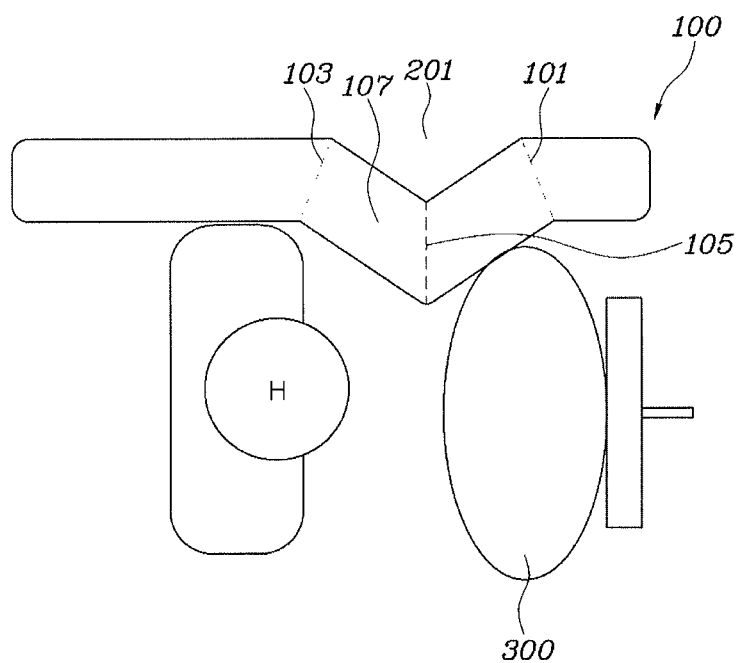
FIG. 1 is a conceptual view of a curtain airbag for a vehicle according to various embodiments of the present invention.
Figure 2:
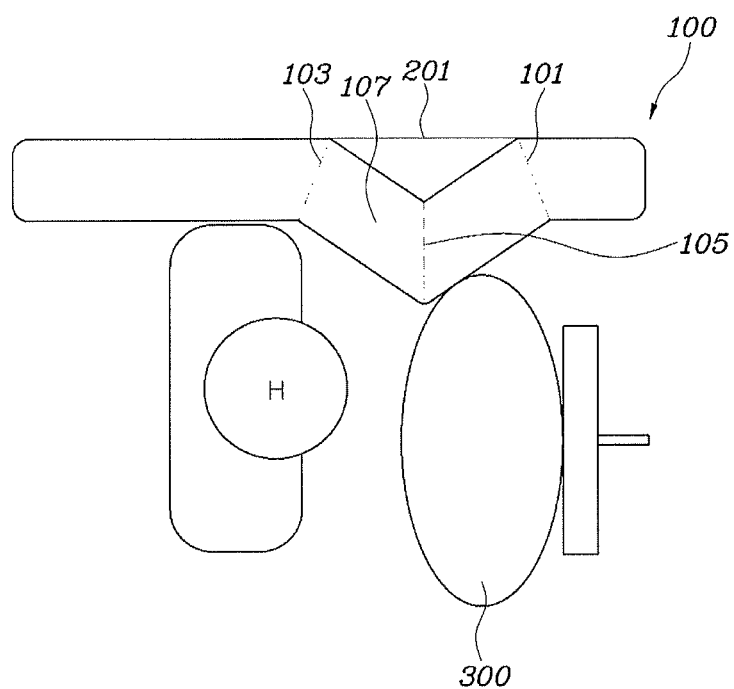
FIG. 2 is a conceptual view of a curtain airbag for a vehicle according to various embodiments of the present invention.
Figure 3:
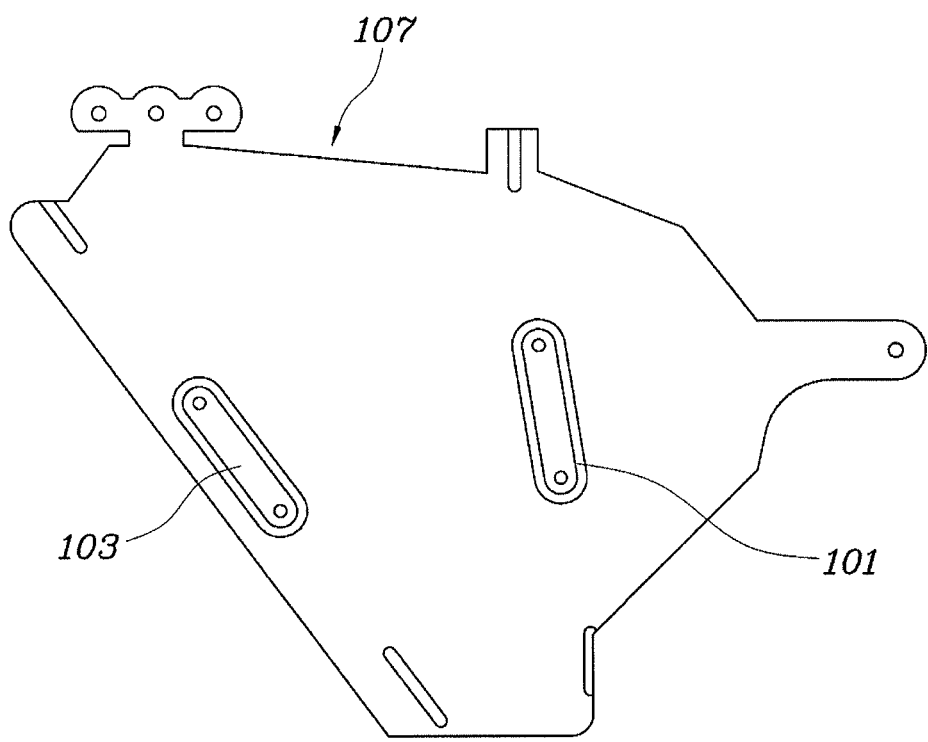
FIG. 3 is a view of a folding portion of a curtain airbag for a vehicle according to various embodiments of the present invention.

FIG. 1 is a conceptual view of a curtain airbag for a vehicle according to various embodiments of the present invention, FIG. 2 is a conceptual view of a curtain airbag for a vehicle according to various embodiments of the present invention, and FIG. 3 is a view of a folding portion of a curtain airbag for a vehicle according to various embodiments of the present invention.

Figure 4:
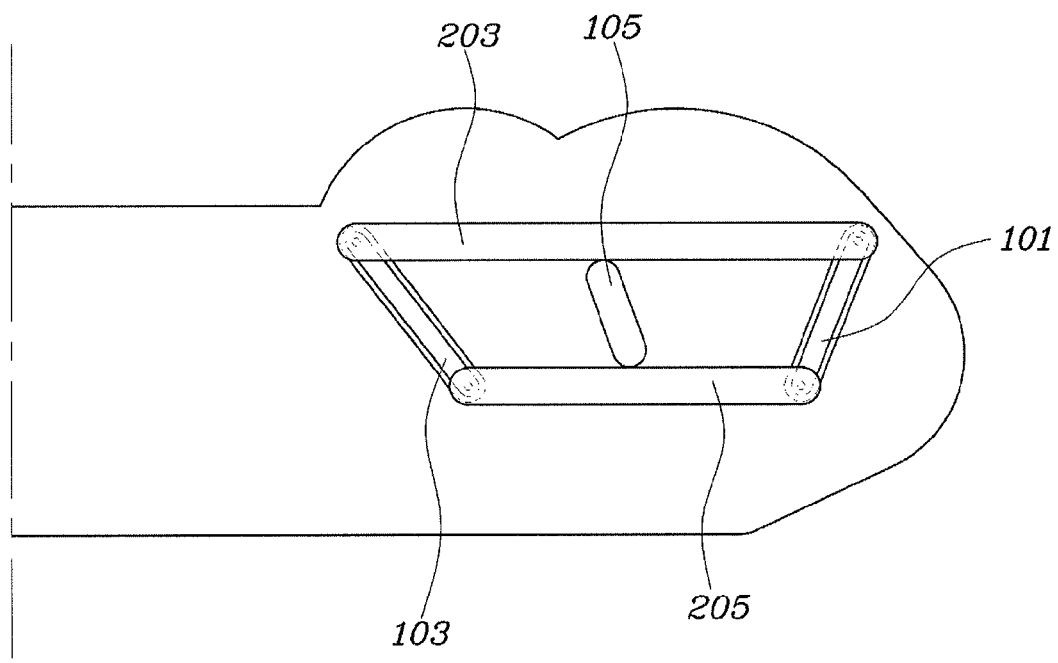
FIG. 4 and FIG. 5 are views of a panel tether of a curtain airbag for a vehicle according to various embodiments of the present invention.
Figure 5:
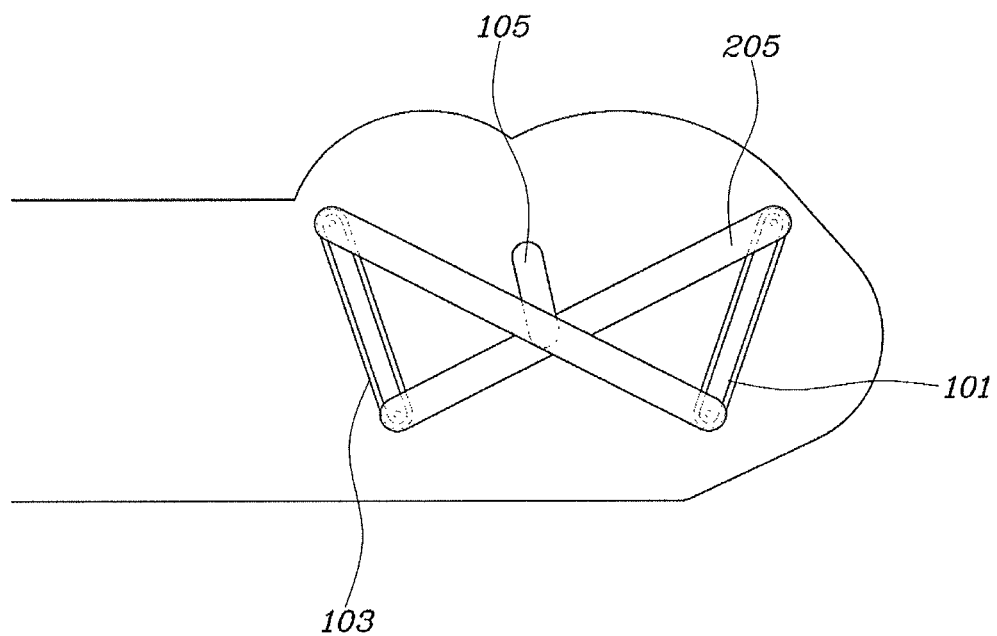
Figure 6:
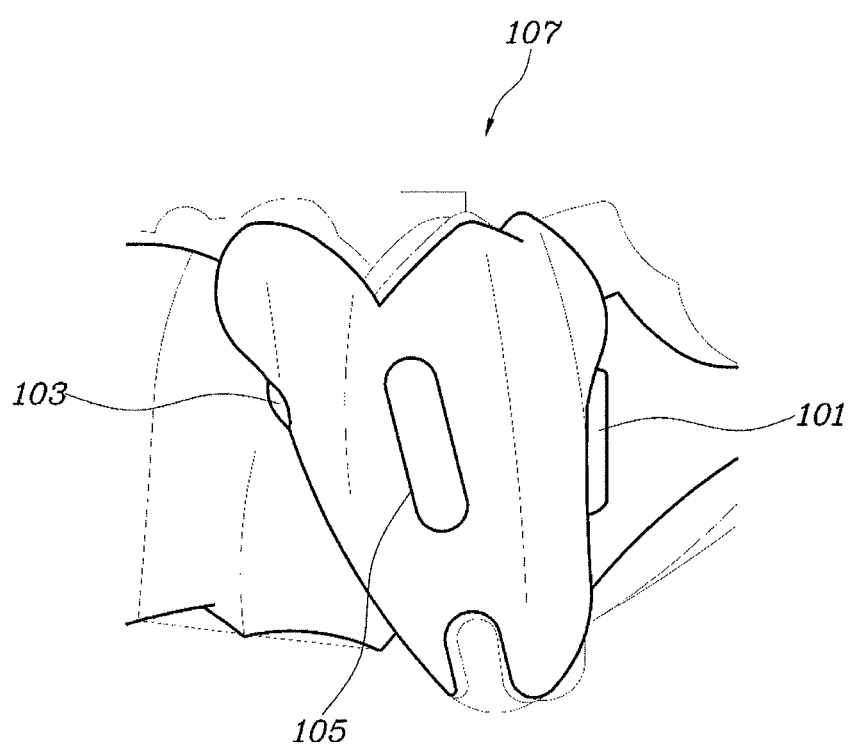
FIG. 6 is a view when a protruding portion of a curtain airbag for a vehicle according to various embodiments of the present invention is fully inflated.
Figure 7:
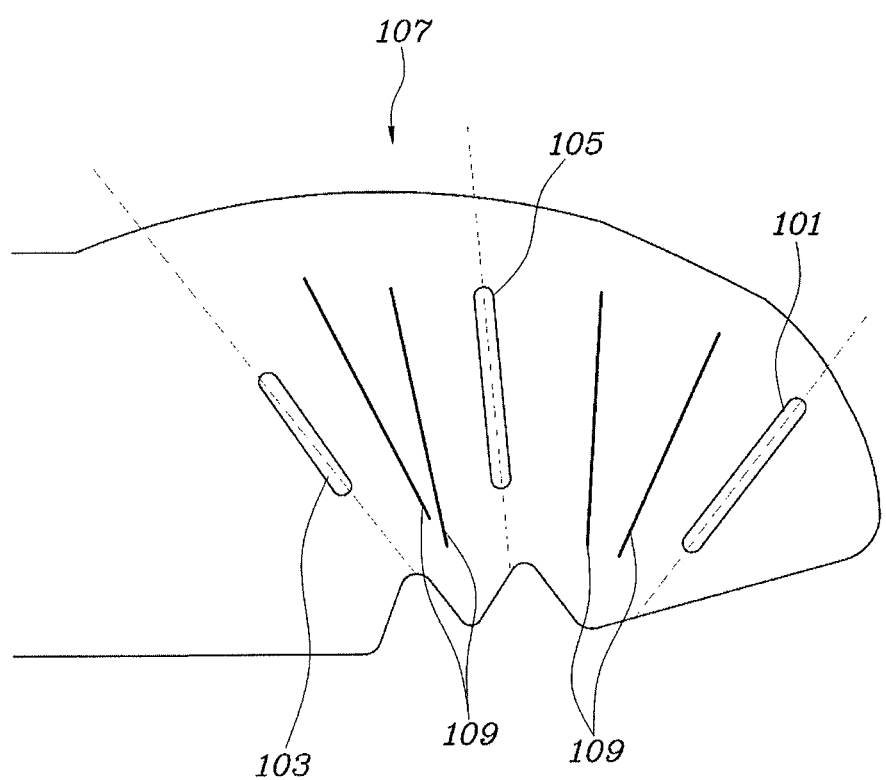
FIG. 7 is a view of a folding portion according to various embodiments of the present invention.

FIGS. 4 and 5 are views of a panel tether 201 of a curtain airbag for a vehicle according to various embodiments of the present invention, FIG. 6 is a view when a protruding portion 107 of a curtain airbag for a vehicle according to various embodiments of the present invention is fully inflated, and FIG. 7 is a view of a folding portion according to various embodiments of the present invention.

In order to achieve the objects of the present invention, a curtain airbag for a vehicle according to the present invention includes a curtain airbag cushion 100, a first folding portion 101 that is formed from an indoor side to a window side of the curtain airbag cushion 100 at a predetermined distance rearward from the front end of the curtain airbag cushion 100, a second folding portion 103 that is formed from the indoor side to the window side of the cushion airbag 100 at a predetermined distance rearward from the first folding portion 101, a panel tether 201 that connects the first folding portion 101 and the second folding portion 103 to each other on the window side of the curtain airbag cushion 100 and is shorter than the length of the window side of the curtain airbag cushion 100 between the first folding portion 101 and the second folding portion 103; and a protruding portion 107 that protrudes inward between the first folding portion 101 and the second folding portion 103 of the curtain airbag cushion 100 by tension of the panel tether 201.

In general, a curtain airbag is elongated along a side of the roof panel of a vehicle in the front-rear direction of the vehicle in order to protect the heads of passengers in the front and rear seats and prevent a driver from being thrown out through a door glass in a crash by being inflated between the passengers and door glasses by an inflator.

Drivers have been protected from a head-on collision and a side collision of a vehicle by a front airbag 300 and a curtain airbag, respectively. However, in an oblique collision rather than a head-on collision, drivers have not been sufficiently protected due to their unexpected movement.

In detail, the head H of a driver hits the A-pillar through the space between the driver airbag 300 and a curtain airbag in an oblique collision of a vehicle or the head H is turned by pressure of the front airbag 300 that is inflated when the head H is loaded to the door-side end of the driver airbag 300, thereby damaging the neck or the brain. Accordingly, as shown in FIGS. 1 and 2, the airbag of the various embodiments of the present invention is configured to block the space between the driver airbag 300 and the curtain airbag and support the head H of a driver, using the protruding portion 107 that protrudes inside from the curtain airbag in order to prevent the head H of the driver from protruding through the space between the front airbag 300 and the curtain airbag.

The protrusion of the protruding portion 107 inside is described in detail. The first folding portion 101 is formed at a predetermined distance rearward from the front end of the curtain airbag cushion 100, the second folding portion 103 is formed at a predetermined distance rearward from the first folding portion 101, and then the first folding portion 101 and the second folding portion 103 are connected by the panel tether 201 that is shorter than the length of the window side of the curtain airbag cushion 100 between the first folding portion 101 and the second folding portion 103. When gas is supplied into the curtain airbag cushion 100 by an inflator, tension is generated between the first folding portion 101 and the second folding portion 103 at the window side by the panel tether 201 while the curtain airbag cushion 100 inflates, so the protruding portion 107 protrudes inside at the indoor side where the tension is not applied.

The first folding portion 101 and the second folding portion 103 may be inclined with the upper ends inclined rearward. The second folding portion 103 may be inclined further rearward than the first folding portion 101. The first folding portion 101 may be inclined with the upper end inclined forward, while the second folding portion 103 may be inclined with the upper end inclined rearward.

It is possible to adjust the shape of the protruding portion 107 by adjusting the inclination of the first folding portion 101 and the second folding portion 103. The upper end of the protruding portion 107 is the most important part for supporting the head H of the driver in an oblique collision, so it has to have a sufficient supporting force in order to prevent the head H of the driver from hitting against the A-pillar.

Accordingly, the protruding portion 107 is regulated by changing the position and the inclination of the first folding portion 101 and the second folding portion 103, as shown in FIGS. 3 to 5. In detail, the upper end of the first folding portion is inclined rearward and the second folding portion 103 is inclined with the upper end inclined rearward further than the upper end of the first folding portion 101 so that the protruding portion 107 is inclined rearward and the upper end protrudes widely inside further than the lower end.

Further, it is possible to further protrude the upper end of the protruding portion 107 by inclining forward the upper end of the first folding portion and inclining rearward the upper end of the second folding portion 103.

When the curtain airbag is fully inflated, the protruding portion 107 is positioned behind the driver airbag 300 and supported by the driver airbag 300, so it can obtain a supporting force.

When the curtain airbag is fully inflated, the indoor end of the protruding portion 107 comes in contact with the door-side end of the driver airbag 300, so it can block the space between the curtain airbag and the driver airbag 300.

As for small vehicles, the distance between the curtain airbag and the driver airbag 300 is small, so even if the protruding portion 107 protrudes a little, it can be sufficiently supported by the driver airbag 300, as shown in FIG. 1. As for large vehicles, however, the distance between the curtain airbag and the driver airbag 300 is large, so the protruding portion 107 has to protrude much in order to be sufficiently supported by the driver airbag 300. However, in order to increase the protruding amount of the protruding portion 107, the volume of the curtain airbag cushion 100 is necessarily increased, but it is limited to increase the capacity of the inflator, so, as shown in FIG. 2, the protruding amount at the upper end of the protruding portion 107 is increased so that the space between the driver airbag 300 and the curtain airbag is blocked by the protruding portion 107.

The panel tether 201 is composed of a first panel tether 203 and a second panel tether 205. The first panel tether 203 connects the upper ends of the first folding portion 101 and the second folding portion 103 to each other on the window side of the curtain airbag cushion 100, while the second panel tether 205 connects the lower ends of the first folding portion 101 and the second folding portion 103 to each other on the window side of the curtain airbag cushion 100.

The second panel tether 205 may be shorter than the first panel tether 203.

The panel tether 201 may include a first panel tether 203 and a second panel tether 205, in which the first panel tether 203 and the second panel tether 205 may connect the upper ends and the lower ends of the first folding portion 101 and the second folding portion 103, crossing each other.

The panel tether 201 may be attached to the window side of the curtain airbag cushion to generate tension between the first folding portion 101 and the second folding portion 103. The distances between the upper and lower ends of the first folding portion 101 and the second folding portion 103 depend on the angles of the first folding portion 101 and the second folding portion 103. Although it may be possible to connect the centers of the folding portions using one panel tether, it is limited to adjust the shape of the protruding portion 107.

Accordingly, as shown in FIG. 4, the panel tether 201 includes a first panel tether 203 and a second panel tether 205 that is shorter than the first panel tether 203 and generates tension at the upper and lower ends of the protruding portion 107, whereby it is possible to more precisely adjust the shape of the protruding portion 107.

Further, as shown in FIG. 5, when the upper and lower ends of the first folding portion 101 and the second folding portion 103 are connected to cross each other, it is possible to make the protruding amounts at the upper and lower ends of the protruding portion 107 different, even though the first panel tether 203 and the second panel tether 205 are the same in length.

A third folding portion 105 is provided between the first folding portion 101 and the second folding portion 103, so the protruding portion 107 can bend to protrude inside at the third folding portion 105 when the curtain airbag is inflated.

Although there is no problem with the protruding portion 107 protruding inside even without the third folding portion 105, it is possible to specify the position of the end of the protruding portion which protrudes innermost by providing the third folding portion 105, as shown in FIG. 6, so it becomes easy to adjust the positional relationship between the driver airbag 300 and the protruding portion 107.

The protruding portion 107 has a plurality of longitudinal seams 109 such that the upper ends are further inclined rearward at the second folding portion 103 than the first folding portion 101 to make an arc shape.

In the longitudinal seams 109 on the protruding portion 107, the number of the seams 109 between the first folding portion 101 and the third folding portion 105 and the number of the seams 109 between the second folding portion 103 and the third folding portion 105 may be different.

As there are the seams on the protruding portion 107, as shown in FIG. 7, the volume of the protruding portion 107 is reduced, the spreading speed of the gas is increased, and the pressure of the gas flowing into the chambers divided by the seams 109 is increased, so the force that maintains the protruding portion 107 is increased. Further, the pressure of the gas flowing into the chambers divided by the seams 109 can be adjusted by adjusting the number of the seams 109 at both sides of the third folding portion 105, so it is possible to adjust the force that maintains the protruding portion 107.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. A curtain airbag for a vehicle, comprising:
a curtain airbag cushion;

a first folding portion formed from an indoor side to a window side of the curtain airbag cushion, and at a predetermined distance rearward from a front end of the curtain airbag cushion;

a second folding portion formed from the indoor side to the window side of the cushion airbag at a predetermined distance rearward from the first folding portion;

a panel tether connecting the first folding portion and the second folding portion on the window side of the curtain airbag cushion, the panel tether being shorter than a length of the window side of the curtain airbag cushion between the first folding portion and the second folding portion; and a protruding portion protruding inward between the first folding portion and the second folding portion of the curtain airbag cushion by tension of the panel tether, when the curtain airbag cushion is deployed.

2. The curtain airbag of claim 1, wherein the first folding portion and the second folding portion are inclinedly oriented with upper ends thereof inclined rearward.

3. The curtain airbag of claim 1, wherein the second folding portion is inclinedly oriented further rearward than the first folding portion.

4. The curtain airbag of claim 1, wherein the first folding portion is inclinedly oriented with an upper end inclined forward and the second folding portion is inclinedly oriented with an upper end inclined rearward.

5. The curtain airbag of claim 1, wherein the panel tether comprises a first panel tether and a second panel tether;

the first panel tether connects upper ends of the first folding portion and the second folding portion on the window side of the curtain airbag cushion; and the second panel tether connects lower ends of the first folding portion and the second folding portion on the window side of the curtain airbag cushion.

6. The curtain airbag of claim 5, wherein the second panel tether is shorter than the first panel tether.

7. The curtain airbag of claim 1, wherein the panel tether comprises a first panel tether and a second panel tether, and the first panel tether and the second panel tether connect upper ends and lower ends of the first folding portion and the second folding portion, crossing each other.

8. The curtain airbag of claim 1, wherein when the curtain airbag is fully inflated, the protruding portion protrudes behind a front airbag and supported by the front airbag.

9. The curtain airbag of claim 1, wherein when the curtain airbag is fully inflated, the protruding portion blocks a space between the curtain airbag and the front airbag, with an indoor end of the protruding portion in contact with a door-side end of the front airbag.

10. The curtain airbag of claim 1, wherein a third folding portion of the curtain airbag is provided between the first folding portion and the second folding portion, and the protruding portion is bent to protrude inside at the third folding portion when the curtain airbag is inflated.

11. The curtain airbag of claim 3, wherein a plurality of longitudinal seams is formed on the protruding portion such that the upper ends at the second folding portion are inclined further rearward than the first folding portion to make an arc shape.

12. The curtain airbag of claim 10, wherein a plurality of longitudinal seams is formed on the protruding portion, and a number of the seams between the first folding portion and the second folding portion and a number of the seams between the second folding portion and the third folding portion are different.

* * * * *